Aug. 22, 1944.  W. W. WILLIAMS  2,356,638
REFRIGERATING APPARATUS
Filed Aug. 3, 1940    4 Sheets-Sheet 1
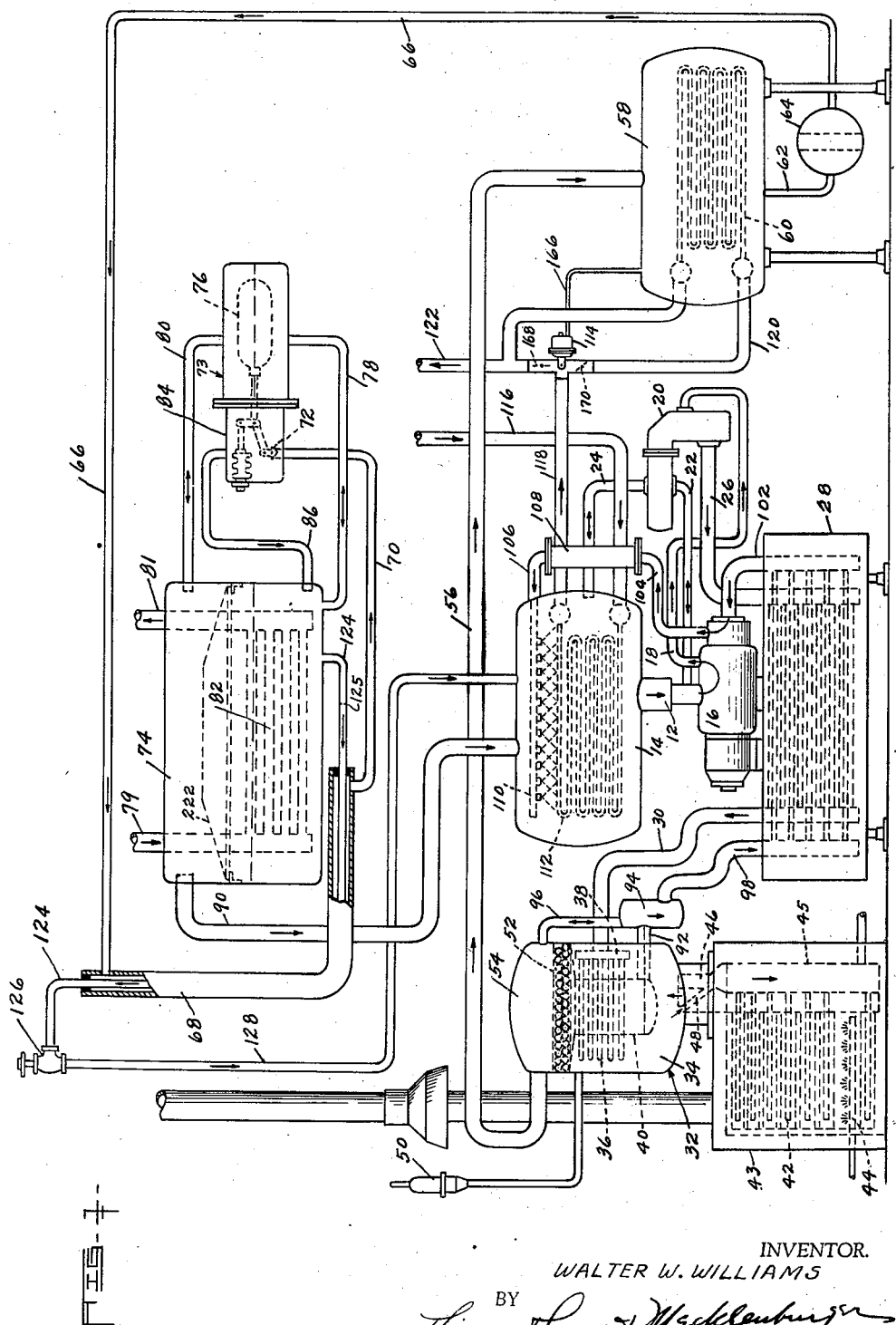
INVENTOR.
WALTER W. WILLIAMS
BY
ATTORNEY.

Aug. 22, 1944.    W. W. WILLIAMS    2,356,638
REFRIGERATING APPARATUS
Filed Aug. 3, 1940    4 Sheets-Sheet 2
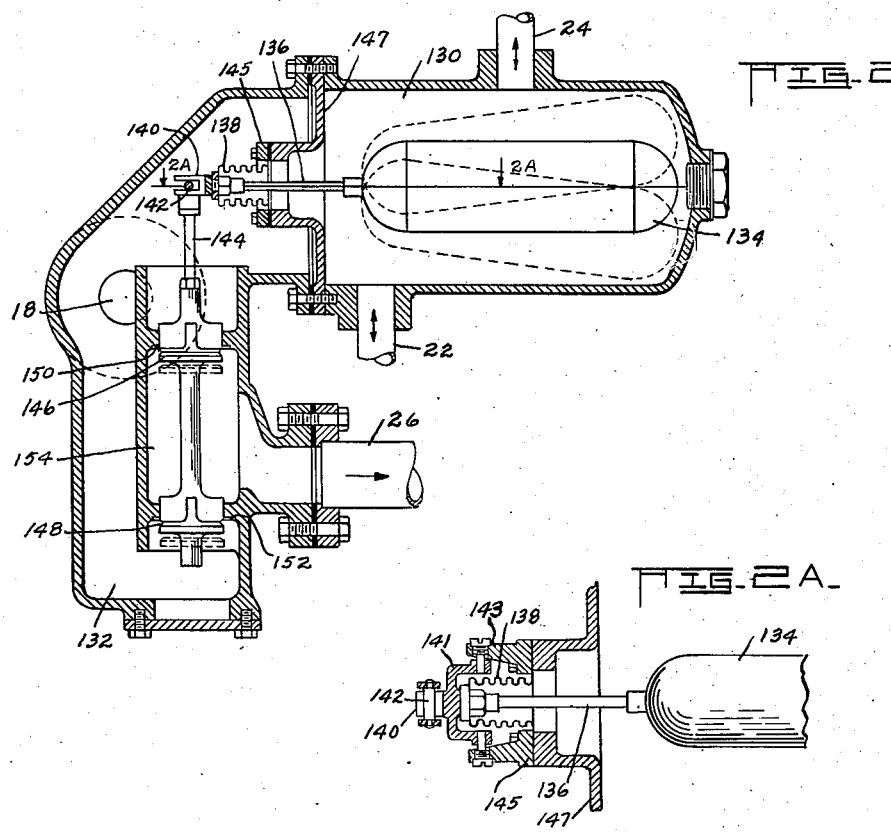
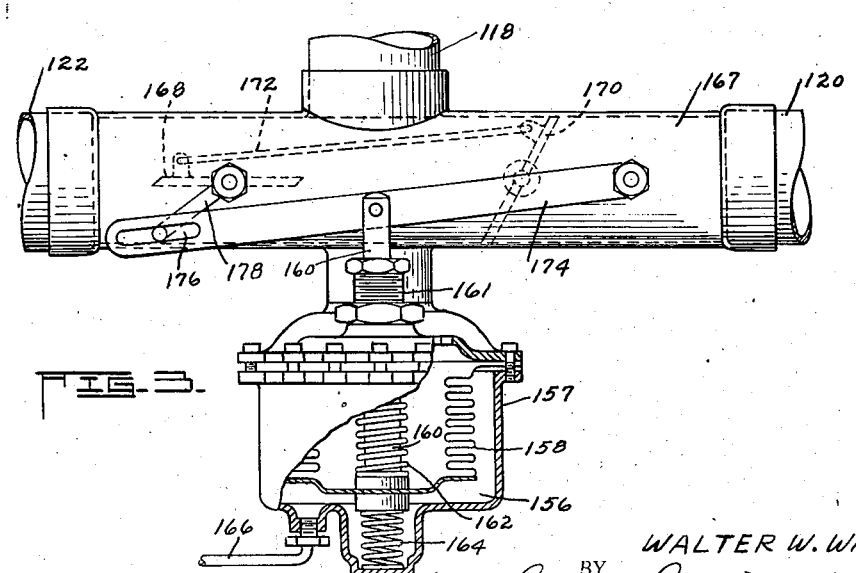
INVENTOR.
WALTER W. WILLIAMS
BY
ATTORNEY.

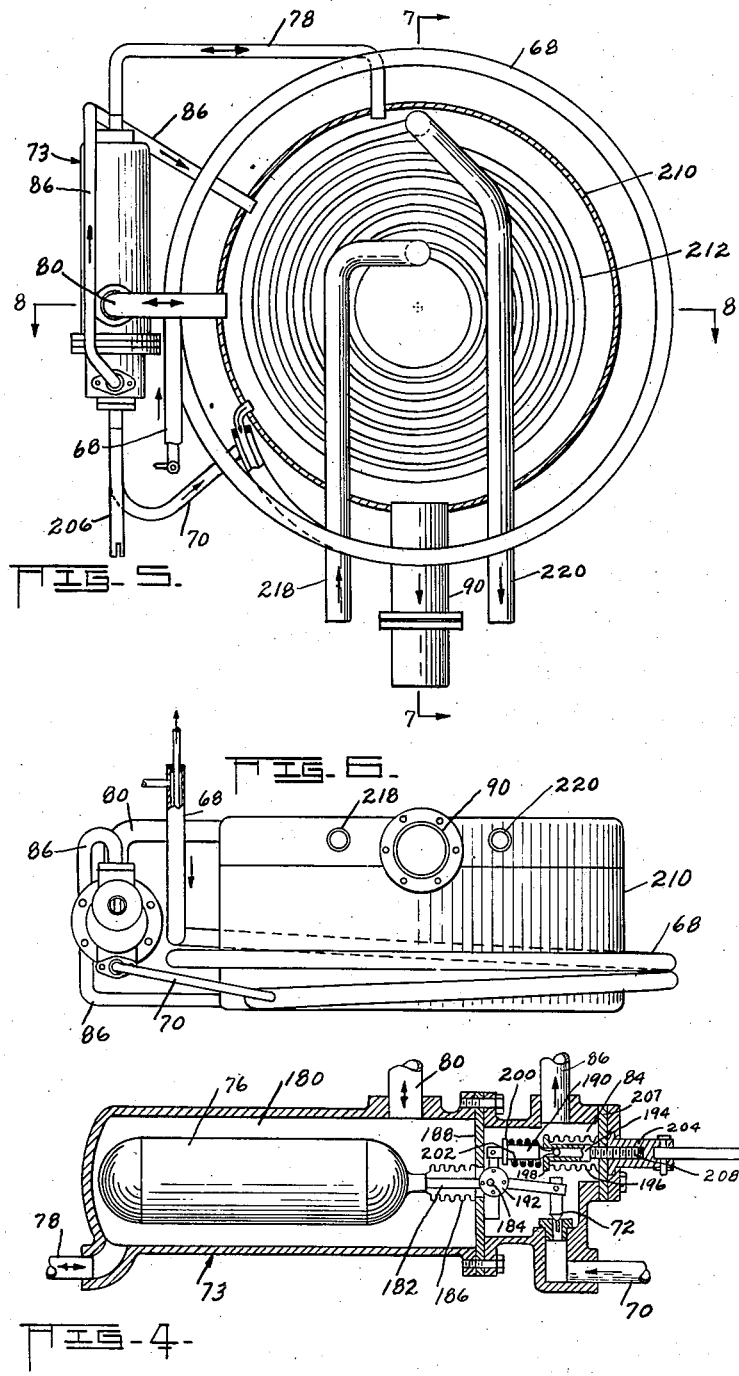

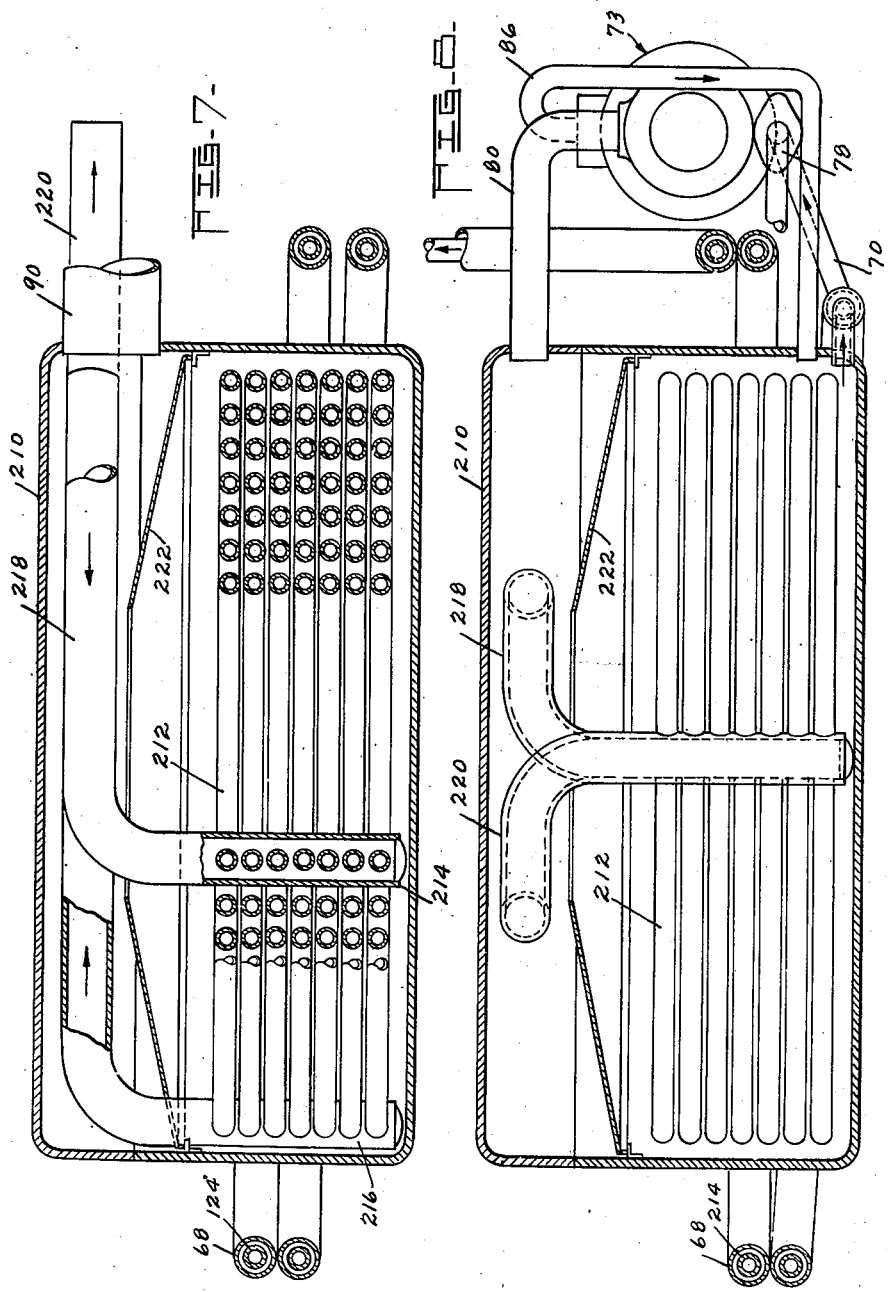

Patented Aug. 22, 1944

2,356,638

UNITED STATES PATENT OFFICE 2,356,638

REFRIGERATING APPARATUS

Walter W. Williams, Chicago, Ill.

Application August 3, 1940, Serial No. 350,993

11 Claims. (Cl. 62—5)

This invention relates to a refrigeration apparatus, and more particularly to a refrigerating apparatus of the absorption type.

More particularly, this invention relates to the provision of a new and improved absorption refrigerating apparatus in which a fluid, such as water or air, may be chilled to produce the desired refrigeration. The apparatus or system herein disclosed is adapted for use primarily in air conditioning systems or refrigerating systems of a domestic or commercial type, and it is an object thereof to provide means for regulating the transfer of solvent and refrigerant in a refrigerating system whereby optimum heat transfer and economy result.

It is also an object of this invention to provide control means in a refrigerating apparatus for regulating the flow of refrigerant and solvent whereby optimum operating conditions are attained.

A further object of this invention is the provision of a chilling apparatus in an absorption refrigerating system which provides means for efficiently chilling a fluid that is passed therethrough.

Further and additional objects will appear from the following description, the appended drawings, and the accompanying claims.

An absorption refrigerating apparatus constructed in accordance with one embodiment of this invention comprises an absorber in which the refrigerant vapor, such as methylene chloride, is absorbed by a solvent, such as the dimethyl ether of tetraethylene glycol; a generator or heater in which the refrigerant is distilled from the strong solution; a heat exchanger for effecting the transfer of heat between the hot, weak, solvent solution flowing from the heater to the absorber and the cool, strong solution of refrigerant dissolved in the solvent flowing from the absorber to the heater; a condenser in which the refrigerant vapor from the heater is condensed to a liquid; and a chiller into which the refrigerant liquid is expanded and through which the fluid to be cooled is passed.

In the operation of the above apparatus, the gaseous refrigerant is dissolved in the liquid solvent in the absorber, and the mixture of strong solution is circulated through the heat exchanger to the generator. Within the generator the strong solution is subjected to elevated temperatures, causing the refrigerant to separate from the solvent in the form of a vapor. The refrigerant vapor is passed to a condenser where it is cooled and condensed to a liquid, and the condensed liquid is expanded through an expansion valve and passed to the chilling unit. The expansion valve may be float-controlled so that the amount of liquid refrigerant passing therethrough into the chiller is dependent upon the liquid level of refrigerant within the chiller, and a constant level may thereby be maintained. The refrigerant vapors formed in the chiller are then recirculated from the chiller unit to the absorber wherein they are re-absorbed by the weak solution of solvent which is withdrawn from the heater or generator, returned through the heat exchanger, strained and reintroduced into the absorber.

Means are also provided for returning any small quantities of solvent that may inadvertently collect in the chiller. The rate of flow of strong solution pumped from the absorber may be controlled by a specially constructed float valve which will be hereinafter more fully described. Also the amount of flow of the cooling water through coils in the absorber and the condenser may be regulated by an automatic pressure-controlled valve which operates to automatically maintain the high side pressure in the apparatus at a substantially constant predetermined value regardless of the temperature of the cooling water. The pressure on the high side of the system is about atmospheric or slightly above, and the pressure of the low side is between about 20 to 25 inches of mercury vacuum when methylene chloride and the dimethyl ether of tetraethylene glycol are used as the refrigerant and solvent, respectively.

For a more complete understanding of this invention, reference will now be had to the drawings, in which Figure 1 is a diagrammatic view of a complete refrigerating apparatus constructed in accordance with one embodiment of this invention;

Fig. 2 is a central longitudinal sectional view of the balanced float valve indicated in Fig. 1 for controlling the amount of strong solution pumped from the bottom of the absorber to the heat exchanger;

Fig. 2—A is a fragmentary sectional view taken on the line 2A—2A of Fig. 2;

Fig. 3 is a side elevational view, partially in section, of a valve employed in the system shown in Fig. 1 which is used to regulate the amount of cooling water passing through the coils of the condenser;

Fig. 4 is a central longitudinal sectional view of a float-controlled expansion valve which may be employed to expand the refrigerant and regulate the flow of it into the chilling chamber or unit of the apparatus in such a manner that a constant level of the refrigerant in the chilling chamber is maintained;

Fig. 5 is a plan elevational view, partially in section, of a chilling unit constructed in accordance with one embodiment of this invention;

Fig. 6 is a side elevational view of the construction shown in Fig. 5;

Fig. 7 is a central longitudinal sectional view with parts shown in elevation, of the chilling unit taken along the line 7—7 of Fig. 5;

Fig. 8 is similar to Fig. 7, but taken along the line 8—8 of Fig. 5.

Referring now more particularly to Fig. 1, it is believed that the refrigerating apparatus there shown can best be understood by tracing the circulation of the various fluids therein.

The strong solution of solvent and refrigerant is removed from the sump 12 of an absorber 14 by a duplex pump 16, driven by any suitable means (not shown). The pump 16 is preferably one of the impositive displacement type, such as a centrifugal pump, wherein the volume of fluid pumped through it may be controlled by the back pressure on the pump. The solution is discharged from the pump through a conduit 18 to a float-control valve 20 (to be hereinafter more fully described) having conduits 22 and 24 associated therewith leading to a conduit below the sump 12 and to the absorber 14, respectively, which serve to maintain a level of liquid in the valve the same as the level in the sump 12. The float-controlled valve thus regulates the rate of strong solution pumped from the absorber, and is adjusted to prevent the level of fluid in the sump from falling below a predetermined level, whereby cavitation of the pump is prevented.

From the float valve 20 the strong solution passes through a conduit 26, a heat exchanger 28, and a conduit 30 into the manifold 38 of a heater or generator 32. The generator comprises a steam jacket 34 having disposed therein a plurality of coils 36 fed from the manifold 38, each of which coils discharges into an inner receptacle 40 of the heater 32. The steam chamber 34 is supplied with live steam from the steam coils 42 of a boiler 43, which boiler is heated by a gas or oil burner 44. The steam passes from the steam coils 42 into a header 45 and thence through the duct 46 into the steam chamber 34, the condensate returning back to the header 45 through conduit 48. A safety valve 50 is provided for the steam chamber. This generator 32 is more fully described in a copending application for "Generators," Serial No. 246,030, of Glenn F. Zellhoefer, filed December 16, 1938, now Patent No. 2,280,210, dated April 21, 1942.

The strong solution pumped into the manifold 38 of the heat generator 32 is passed through the coils 36 and discharged into the inner receptacle 40. In this receptacle, maintained at elevated temperatures by the steam jacket 34, the refrigerant separates from the solvent and the refrigerant vapors pass through an eliminator 52 to the upper portion 54 of the generator and thence through a conduit 56 to a condenser 58. The temperature of the condenser 58 is controlled by cooling coils 60 which are supplied with water in a manner to be hereinafter more fully described.

The refrigerant vapors condensed in the condenser 58 pass as a liquid through conduit 62, a dehydrator 64, and conduit 66 to the outer jacket of a heat exchanger 68. From the heat exchanger 68 the liquid passes through conduit 70 to a float-controlled valve 72 positioned in a housing 73 and which will be hereinafter more fully described.

The float-operated valve 72 serves as an expansion valve for the liquid refrigerant; thus the liquid passing through the valve 72 passes from a high pressure zone in the conduit 70 to a low pressure zone within the valve chamber 84. A portion of the liquid refrigerant vaporizes, resulting in cooling, and the cold vapors and liquid refrigerant mixture passes from the valve chamber 84 through conduit 86 to the chilling chamber 74. The liquid refrigerant passing into the chiller is maintained at a constant level in the chiller 74 by controlled addition of refrigerant thereto as regulated by means of the float-controlled valve 72. The float valve 72 is operated by the float 76 maintained at about the same level as the liquid in the chiller 74 through the equalizing lines 78 and 80.

A medium to be cooled enters chiller 74 through a conduit 79, passing through coils 82 submerged in the liquid refrigerant and out through a conduit 81, for use as desired. The fluid passing through the coils 82 is in heat-exchange relationship with the refrigerant in the chiller 74, and the refrigerant is thereby caused to boil by the exchange of heat from the relatively warm fluid in the coils 82 to the refrigerant. The level of liquid refrigerant in the chiller may be adjusted as desired, but it is preferable to have it extend up above the level of the coils 82 within the chiller through which the fluid to be cooled is circulated. The boiling of the refrigerant vapors from the body of liquid refrigerant causes a chilling of the coils 82, and the vapor escape from the top of the chiller 74 through conduit 90 to the upper portion of the absorber 14, wherein the refrigerant vapors are again contacted with the solvent for re-absorption and recirculation through the heat exchanger 28 and the generator 32, as hereinbefore described.

The weak solvent solution from which the refrigerant has been distilled in the heater or generator 32 drops to the bottom of the inner chamber 40 of the generator and passes out thereof by gravity flow through conduit 92 into a sump 94, the sump being provided with a vent 96 leading to the upper portion 54 of the generator 32. From the bottom of the sump 94 the weak solution passes by gravity flow through conduit 98 to the heat exchanger 28, where the heat of the weak solution is transferred to the strong solution leaving the absorber and entering the heater in counterflow arrangement on the heat exchanger. The preheating of the strong solution prior to the passage thereof into the heater effects an economy in steam consumption in the heater. From the heat exchanger 28, the weak solution is recirculated to the absorber 14 through conduits 102, the other half of the pump 16, conduit 104, strainer 108, and conduit 106. The pump serves to maintain a constant head of solvent in a nozzle bank 110 through which the weak solution is pumped into the absorber 14 onto water-cooled coils 112. The refrigerant vapors are re-absorbed by the weak solvent, and the solvent containing the absorbed refrigerant vapors is then withdrawn from the bottom of the absorber 14 through the sump 12 and recycled as hereinbefore described.

The cooling coils 112 are provided in the absorber 14 for the purpose of dissipating the heat of solution evolved when the gaseous refrigerant is re-absorbed by the solvent. The coils further function to provide a means for distributing the solvent in thin films over the surface of the interior of the absorber so that the refrigerant may be readily absorbed by the solvent.

The condenser 58 is also provided with fluid-cooled coils in order to cool the gaseous refrigerant from the generator to the point of liquefaction at the relatively high pressure in that portion of the system. It is important that the pressure on the high pressure side of the system be maintained sufficiently great to cause optimum flow of the refrigerant through the system, and further to permit the weak liquor to be forced from the bottom of the chamber 40 in the heater 32 back through the heat exchanger 28 and into the absorber 14. In order to effect this control and to maintain the condensate at a temperature so that proper pressure differentials will be maintained, the volume of cooling fluid passing through the coil 60 of the condenser 58 is automatically regulated by valve 114 which in turn is operated by the pressures within the condenser 58. A detail view of the valve is shown in Fig. 3 and will be hereinafter more fully described.

Fluid such as water is passed from a suitable source of supply, such as a water tower, through conduit 116, through the coils 112 of the absorber 14, and through conduit 118 to the two-way valve 114. The valve 114 is pressure operated and so constructed that increased pressure of the refrigerant within the condenser 58, resulting from a warming up of the condenser during normal operation, causes the valve to operate so that an increased amount of cooling fluid will pass from the conduit 118, through conduit 120 and into the cooling coils of the condenser. The cooling effect of the fluid within the coils of the condenser decreases the pressure of the refrigerant therein which has the effect of operating valve 114 through the pressure line 166 in the opposite direction, causing more of the water to by-pass the condenser and escape from the system through conduit 122. By this means the temperature within the condenser is accurately controlled, which, in turn, controls the pressure on the weak solvent solution within the container 40 of the heater 32, thereby insuring its proper return through the heat exchanger 28 to the absorber 14. Constant pressures and temperatures are therefore obtainable in the condenser even though the temperature of the cooling fluid may be varied over a wide range.

In the operation of the above-described system, a small amount of solvent may be carried over by the refrigerant from the heater 32, through the condenser 58, and into the chilling chamber 74. In order to remove the small amounts of solvent thus carried over, a drain pipe 124 is provided in the bottom of the chiller 74, the drain pipe having a restricted orifice 125 for regulating the flow of refrigerant and solvent to the heat exchanger. This drain pipe extends through the heat exchanger pipe 68, through which latter the liquid refrigerant passes from the condenser 58 to the valve 72. The pipe 124 extends through the exchanger 68 upwardly to a point above the level of solvent within the chiller 74. The mixture of refrigerant and solvent in the pipe 124 are heated in the heat exchanger 68 by the relatively warm liquid therein supplied from the condenser 58. The refrigerant in the pipe 124 (the low pressure side of the system) is thus caused to boil by this increased temperature, and the escaping refrigerant vapors entrain the solvent and carry it out through the upper portion of the pipe 124, the release valve 126, and a return conduit 128 back to the absorber 14. The restricted orifice 125 in the pipe 124 serves to prevent the solution within the heat exchanger from boiling back into the chiller 74.

Referring now more particularly to Fig. 2 of the drawings, a flow control valve is shown which is particularly useful for regulating the amount of strong solution circulated from the sump 12 of the absorber 14 to the heat exchanger 28. This flow control valve, which is indicated generally at 20 in Fig. 1, comprises a float chamber 130 and a flow chamber 132. The float chamber, as previously indicated, opens through conduits 22 and 24 into the sump and the upper portion of the absorber, respectively, whereby the liquid level in the float chamber 130 is maintained at a level corresponding to the level in the sump. A float 134 is shown in full lines in the drawings in a middle position, which is substantially the normal position thereof and varies therefrom as indicated by the dotted-line position thereof. The float 134 is secured to a float rod 136, which latter extends from the float chamber 130 through a suitable bellows 138 for fixed connection to a U-shaped member 140, the member 140 slidably engaging a pin 142 positioned on one end of a valve stem 144. A pair of opposed arms 141 (see Fig. 2a) extend from the U-shaped member 140 for pivotal engagement with co-operating arms 143 extending from a flange 145. The flange 145, in turn, is secured to a partition 147, which latter separates the float and flow chambers 130 and 132, respectively. The balanced valve is mounted on the opposite end of the valve stem 144. The valve stem has a pair of valve members 146 and 148 adapted to fit tightly against seats bounding the openings 150 and 152 positioned in the opposite sides of a chamber 154 within the solution flow chamber 132, as shown. The conduit 18 discharges into the flow chamber 132, and the conduit 26 leads from the chamber 154 to the heat exchanger 28. It will be clear that when the valve is opened, the solution will enter the flow chamber 132 from the conduit 18 and pass into the chamber 154 between the valve members 146 and 148 and the openings 150 and 152, respectively, equal pressure being exerted in opposite directions on the balanced valve to produce an equalizing effect so that variations in pressure in the system exerted by the pump will not affect the positioning of the valve.

It will be clear from the above description that the opening of the valve and the subsequent discharge of solution through the valve depend upon the positioning of the float 134 within the float chamber. When the liquid level in the sump 12 is high, then the liquid level in the float chamber 130 is also high and the float 134 is raised. When the float is raised, it pivots upwardly, moving the valve stem 144 downwardly, thereby removing the valve members further from their respective seats bounding the openings 150 and 152, as shown by the dotted-line position in the drawings. The solution may then be pumped at a maximum rate from the sump through the valve and to the heat exchanger.

When the liquid level in the sump 12 drops, the float 134 falls, as indicated by the dotted lines in the drawings, and the valve members 146 and 148 are raised, thus throttling the flow of solution through the valve to the heat exchanger 28. When the level of solution in the sump 12 is at a desired position during normal operation, the float 134 assumes a mean position in the float chamber 130 and the desired amount of solution passes from the conduit 18 to the conduit 26 without any substantial fluctuation, irrespective of temporary variations in the rate at which the pump operates. A float-controlled valve has been provided which is equalized and may be placed directly in the discharge line of the pump to regulate the amount of solution pumped from the absorber to the heater. The valve prevents cavitation of the pump, thus eliminating any tendency for the pump to become noisy and inefficient.

In order to control the amount of water flowing through the condenser 58, as has been hereinabove indicated, the two-way valve indicated generally at 114 in Fig. 1 has been provided. This valve is automatically operated by the fluid pressure in the condenser 58, and is shown in detail in Fig. 3 of the drawings to which reference will now be had. The valve construction comprises a pressure chamber 156 within a housing 157, the housing also containing a pressure-operated mechanism including a bellows 158, a plunger 160, a compression spring 162, and a guide spring 164.

The pressure chamber 156 is in direct connection with the vapor chamber of the condenser 58 by means of the pressure conduit 166. Thus, when pressure is applied through the conduit 166, the plunger 160 is pushed upwardly against the compression of spring 162 to extend out of the pressure chamber a greater distance. As shown in Fig. 3, the housing 157 for the pressure chamber 156 is secured to the outside of a conduit 167 within which are pivoted a pair of butterfly valves 168 and 170. As shown, these butterfly valves are reciprocably secured to each other by a rod 172 which extends through holes positioned in projections located on the ends of each of the butterfly valves so that when one is operated, the other one will be also. The length of the rod 172 is so adjusted that the valve 168 is brought into the full open position when the valve 170 is in the full closed position, and vice versa.

The valves 168 and 170 are operated by the plunger 160 by means of a lever 174 pivotally mounted at one end thereof to the outside of the conduit 167. The upper end of the plunger 160, which extends outwardly of a packing gland 161, is pivotally secured to a central portion of the lever 174, the free end of the lever having a slot 176 positioned therein which is adapted to receive the end of a crank bar 178. The crank bar 178 is mounted on the same shaft as, and rotates with, the butterfly valve 168, whereby raising of the crank bar 178 from the position shown in the drawings will close the butterfly valve 168. From the above, it is clear that, when the pressure is increased within the pressure chamber 156, the plunger 160 is raised, which in turn pivots the lever 174 upwardly, causing the butterfly valve 168 to close and the butterfly valve 170 to open. Contrariwise, when the pressure in the pressure chamber 156 drops, the reverse occurs.

As hereinabove explained, it is desirable that an optimum pressure be maintained within the condenser 58 in order to maintain proper pressure differentials in the system and to insure the return of the weak solvent from the inner chamber 40 of the heater 32 back to the absorber 14. In order that this pressure may be regulated, the temperature is controlled in the condenser by the rate at which the cooling fluid is passed therethrough. The two-way valve 114 may be adjusted so that when the pressure becomes greater than the desired optimum, the valve 170 opens and valve 168 closes, whereby a portion of the cooling water is passed through the conduit 120 to the condenser coils 66, automatically cutting down the amount of cooling fluid by-passing the condenser through the conduit 122. If the condenser gets too cold, the pressure in the chamber 156 will be reduced and the amount of fluid by-passing the condenser will be increased.

It will be clear from the above description of the arrangement and operation of the valve 114 that the temperature and pressures within the condenser will always be held at a constant value, regardless of the fluctuations in the temperature of the cooling fluid entering from the absorber through the conduit 118. If the fluid is relatively cold, only small amounts will be passed through the condenser, while if it is comparatively warm, larger amounts will be passed therethrough and only smaller amounts will be by-passed.

A float valve for regulating the amount of liquid refrigerant flowing into the chiller 74 from the condenser 58 is specifically shown in Fig. 4 of the drawings, and is an example of a valve indicated generally at 72 in Fig. 1 thereof. It is also shown in combination with a particular type of chiller unit in Figs. 5, 6, and 8. This valve comprises a float chamber 180 containing the float 76 and the equalizing conduits 78 and 80 leading to the chiller 74 for maintaining the desired liquid level within the float chamber 180. The float 76 is mounted on a rod 182, the rod being pivoted on a pin 184. A bellows 186 serves to prevent fluid leakage through an opening in a partition 188, through which opening the rod 182 extends, and on the other side of which it is pivoted.

The pivotal pin 184 of the rod 182 is within the expansion chamber 84 which contains the needle valve 72, the valve serving to regulate the amount of liquid refrigerant introduced into the expansion chamber 84 from the conduit 70, as hereinbefore described. The conduit 86 provides passage for the cold mixture of liquid and vaporous refrigerant from the expansion chamber 84 to the chilling chamber 74. Here, again, the position of the float 76, which depends upon the liquid level within the chiller 74, regulates the amount of liquid refrigerant introduced into the expansion chamber 84 through the valve 72. When the level of liquid refrigerant in the chiller 74 rises above a predetermined plane, the valve closes to restrict the further introduction of liquid into the chiller.

A means is provided for regulating the operating level within the chamber 180 to actuate the valve 72. The means includes a rod 190 pivotally mounted through a connecting plate 192 to the pivoted end of the float rod 182. The end of the rod 190 is slidably engaged with a guide means 194 attached to a bellows 196, the former having a collar 198 positioned thereon. The rod 190 also has a collar 200, and between the two collars a compressible spring 202 is positioned. The end of the housing of the flow chamber 84 adjacent the bellows 196 is provided with a rotatable member 204 having a gripping means 206 attached thereto and separated from the chamber by means of a stationary plate 207. Associated with the rotatable member 204 is a screw 208 which is adapted to be screwed into the bellows 196 through the plate 207 when the member 204 is rotated, whereby pressure is exerted on the guide means 194 and the spring 202 is compressed between the collars 200 and 198. Increased pressure on the collar 200 by the spring 202 makes more difficult the rise of the float 78 in the float chamber 180, thereby influencing the positioning of the valve 72 when the level of the fluid within the chilling chamber 74 is at a predetermined height. A valve has thus been provided which is adapted readily to control the amount of refrigerant introduced into the chilling chamber and which is further capable of ready adjustment.

In accordance with one embodiment of this invention, a chilling chamber having the structure shown in Figs. 5 to 8, inclusive, of the drawings, may be employed. It may be substituted for the one shown diagrammatically in Fig. 1. The chamber comprises a vertical shell 210 having a plurality of pancake coils 212 positioned therein through each of which water or other fluid to be chilled is passed. The opposite ends of the pancake coils 212 are attached to suitable manifolds 214 and 216, respectively, each of which is in turn secured to an inlet pipe 218 and an outlet pipe 220 for the fluid to be chilled. Immediately above the pancake coils 212 within the shell 210 is positioned a large baffle plate 222 which serves, in effect, as an eliminator and prevents gaseous refrigerant from entraining unvaporized refrigerant and from carrying it back to the absorber through the vapor return conduit 90.

In the modification shown in Figs. 5 through 8, the heat exchanger 68 and the inner pipe 124 (described above in connection with Fig. 1) extend in the form of a spiral helix around the outside of the chiller shell. The chiller and the float-operated expansion valve are connected as indicated in the drawings and in the same manner as previously described in connection with Figs. 1 and 4.

A chiller unit has thus been provided which may be mounted in series with others, and because of the fact that it is flat on the bottom and top and all conduits extend through the side walls, a number of them may be stacked one upon another. These chiller units are therefore readily interchangeable and as many may be used as desired, depending upon the capacity of the particular refrigerating apparatus and the amount of cooling that is required. The vertical shell permits a maximum amount of heat transfer surface in a minimum head of liquid or unvaporized refrigerant therein.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:

1. In an absorption type refrigerating apparatus employing a low pressure refrigerant and including an absorber, a heat exchanger, a heater, a condenser, and a cooling coil, the provision of a centrifugal circulating pump interposed between the absorber and heat exchanger to circulate the solution from the absorber through the heat exchanger to the heater, and a flow regulator including a float-operated valve controlled by the level of the solution in the absorber interposed between the discharge side of the pump and the heat exchanger to maintain a head of solution over the intake side of the pump whereby cavitation of the pump is prevented.

2. The structure of claim 1 wherein the absorber is provided with a sump for collecting the solution and means connecting the sump to the intake side of the pump, and the float for operating the valve for controlling the circulation of solution from the pump to the heat exchanger is mounted in a chamber, the bottom of which is connected to the sump and so arranged that the level of the solution in the sump controls the operation of the flow regulator valve.

3. The structure of claim 1 wherein the flow regulator includes a casing divided into two compartments, one of said compartments mounting a float-operated flow control valve and the other compartment mounting the float therefor, said other compartment being provided with means connecting the bottom of the compartment to the bottom of the absorber and means connecting the top of the compartment above the level of the solution to the absorber above the level of the solution therein.

4. In an absorption type refrigerating apparatus for a low pressure refrigerant having an absorber provided with a sump for collecting the solution, a heater, and a heat exchanger for directing the solution to the heater and returning the solvent to the absorber, in combination with a centrifugal circulating pump and a flow regulator, said pump having its intake connected to the bottom of said sump, said flow regulator including a casing divided into two compartments, one compartment being connected to the discharge of the pump and mounting a float-operated valve through which the solution passes on its way to the heat exchanger and the other compartment mounting a float for opening and closing said valve, means connecting the under side of said other compartment to the sump, and means connecting the upper side of said other compartment to the interior of the absorber and so arranged that the change in level of the solution in the sump actuates the float to operate the valve to regulate the flow therethrough to maintain a head of solution over the intake side of the pump whereby cavitation of the pump is prevented.

5. In an absorption type refrigerating apparatus of the character described including an absorber, a heater, a condenser, and a cooler, the provision of an impositive displacement circulating pump interposed between the absorber and the heater to circulate the solution from the absorber to the heater, and a flow regulator including a valve controlled by the level in the absorber interposed between the discharge side of the pump and the heater to maintain a head of solution over the intake side of the pump.

6. The apparatus of claim 5 in which the valve is of the balanced type, is float-operated, and is substantially unaffected by variations in pressure in the system.

7. In an absorption type refrigerating apparatus, the combination of an absorber, a heater, an impositive displacement pump for withdrawing a solution from the bottom of said absorber and discharging it to said heater, and a valve interposed between said pump and said heater being controlled by the level in the absorber for regulating the withdrawal of said solution from said absorber whereby a head of solution over the intake side of the pump is always maintained.

8. The apparatus of claim 7 in which the valve is of the balanced type, is float-operated, and is substantially unaffected by variations in pressure in the system.

9. In an absorption type refrigerating apparatus of the character described including an absorber, a heater, and an impositive displacement pump for circulating a solution from said absorber to said heater, the combination of a flow regulator associated with the discharge side of said pump, said flow regulator being controlled by the level of the solution maintained in said absorber whereby a head of solution is maintained over the intake side of said pump whereby cavitation of the pump is prevented.

10. In an absorption type refrigerating apparatus of the character described including an absorber, a heater, and an impositive displacement pump for circulating a solution from said absorber to said heater and interposed therebetween, the combination of a flow regulator associated with the discharge side of said pump, said flow regulator comprising a float-operated valve responsive to the liquid level of the solution in said absorber whereby the valve opens when the level rises and the valve closes when the level falls whereby a head of solution is always maintained over the intake side of the pump.

11. In an absorption type refrigerating apparatus of the character described including an absorber, a heater, and an impositive displacement pump for circulating a solution from said absorber to said heater and interposed therebetween, the combination of a flow regulator associated with the discharge side of said pump, said flow regulator comprising a valve of the balanced type which is substantially unaffected by variations in pressure thereon and a float for operating said valve, said float being responsive to variations in the liquid level of the solution in said absorber whereby the flow of solution from the discharge side of said pump is regulated to maintain a head over the intake side of the pump thereby preventing cavitation of the pump.

WALTER W. WILLIAMS.